(12) United States Patent
Balta et al.

(10) Patent No.: US 10,686,844 B2
(45) Date of Patent: Jun. 16, 2020

(54) TRUSTED GROUP IDENTIFICATION CODE

(71) Applicant: International Business Machines Corporation, Armonk, NY (US)

(72) Inventors: Trent Balta, Poughkeepsie, NY (US); Marc H. Coq, Hopewell Junction, NY (US); Colette Manoni, Brewster, NY (US); Corey McQuay, Poughkeepsie, NY (US); Eugene Nitka, Poughkeepsie, NY (US); Collin Walling, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 15/873,346

(22) Filed: Jan. 17, 2018

(65) Prior Publication Data
US 2019/0222613 A1    Jul. 18, 2019

(51) Int. Cl.
| G06F 15/16 | (2006.01) |
| H04L 29/06 | (2006.01) |
| G06F 21/44 | (2013.01) |
| G06K 19/06 | (2006.01) |
| G06F 16/955 | (2019.01) |

(52) U.S. Cl.
CPC ......... *H04L 65/1003* (2013.01); *G06F 21/44* (2013.01); *H04L 65/1069* (2013.01); *H04L 65/1093* (2013.01); *G06F 16/9554* (2019.01); *G06K 19/06037* (2013.01); *H04L 65/40* (2013.01)

(58) Field of Classification Search
CPC ............ H04L 65/1093; G06F 16/9554; G06K 19/06037
See application file for complete search history.

(56) References Cited

U.S. PATENT DOCUMENTS

| 6,801,998 | B1* | 10/2004 | Hanna | H04L 63/045 713/155 |
| 6,912,656 | B1* | 6/2005 | Perlman | H04L 9/0825 709/206 |
| 6,957,330 | B1* | 10/2005 | Hughes | G06F 21/6218 713/162 |
| 7,068,789 | B2* | 6/2006 | Huitema | H04L 29/12009 380/277 |
| 8,794,508 | B1* | 8/2014 | Pascal | H04W 4/21 235/375 |
| 8,874,769 | B2 | 10/2014 | Mao et al. | |
| 9,363,296 | B1 | 6/2016 | Ryu | |
| 9,397,836 | B2 | 7/2016 | Nixon et al. | |

(Continued)

*Primary Examiner* — Douglas B Blair

(57) ABSTRACT

An example operation may include one or more of storing a unique identification code encapsulating encoded information about a trusted group of member devices within a decentralized network, the unique identification code being generated by the trusted group of member devices, decoding the stored unique identification code to generate decoded information which verifies that the user device is a member device of the trusted group of member devices and provides contact information for other member devices of the trusted group of member devices, and establishing a communication session with the trusted group of member devices based on the contact information obtained by decoding the unique identification code.

20 Claims, 5 Drawing Sheets

(56) References Cited

U.S. PATENT DOCUMENTS

| | | | |
|---|---|---|---|
| 2003/0055892 A1* | 3/2003 | Huitema | H04L 29/06 |
| | | | 709/204 |
| 2006/0117024 A1* | 6/2006 | Kaler | H04L 29/12132 |
| 2014/0045472 A1* | 2/2014 | Sharma | H04W 4/08 |
| | | | 455/416 |
| 2015/0052361 A1 | 2/2015 | Winkler-Teufel | |
| 2015/0067340 A1* | 3/2015 | Joye | H04L 9/0869 |
| | | | 713/175 |
| 2015/0127949 A1 | 5/2015 | Patil et al. | |
| 2016/0267738 A1 | 9/2016 | Carstens et al. | |
| 2017/0070343 A1 | 3/2017 | Patil et al. | |
| 2017/0099389 A1* | 4/2017 | George | H04M 3/465 |
| 2017/0142460 A1* | 5/2017 | Yang | H04N 21/25816 |

* cited by examiner

FIG. 2
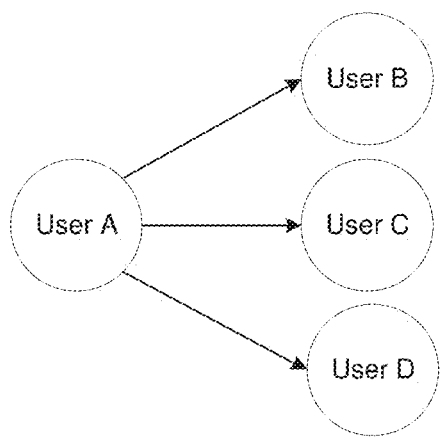
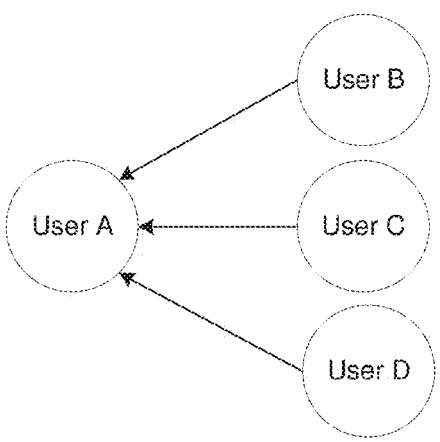
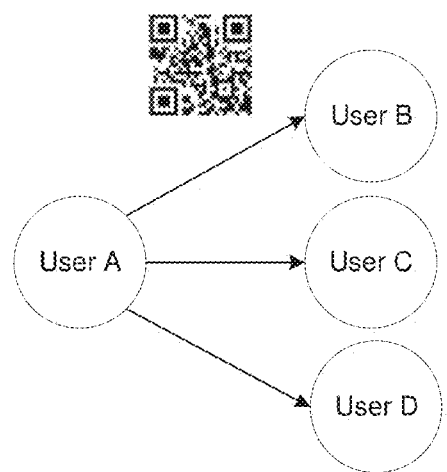
201
User Device A adds its ID information to the code and requests information from User Devices B, C, and D
202
User Devices B, C, and D provide ID information to User Device A
203
User Device A generates unique group ID code based on ID of User Devices A, B, C, and D, and distributes unique group ID code to User Devices B, C, and D

TRUSTED GROUP IDENTIFICATION CODE

TECHNICAL FIELD

This application generally relates to a system for managing a trusted communication group, and more particularly, to a trusted group identification code.

BACKGROUND

With today's various means of impersonal communication which include texting, instant messaging, emails, voice calls, social network, and the like, often there are quick decisions being made within a group of people that are connected to one another via these means of communication. These decisions can be rather trivial such as deciding where to go to lunch, or rather important such as making a large purchase with a shared credit card. The problem with this model is that there is no good method for validating the members of the group in question, or even creating the group securely. Instead, an initiating user of the group must add each member to a sender field of an outgoing message (or dial the numbers on a keypad) which requires the user to traverse through a contact list and make selections. Furthermore, after the group communication has been initiated, the members of the group do not have to verify themselves or the device they are using.

SUMMARY

In one example embodiment, provided is a computing device that includes one or more of a network interface, a storage configured to store a unique identification code that encapsulates encoded information about a trusted group of member devices within a decentralized network, the unique identification code being generated by the trusted group of member devices, and a processor configured to decode the stored unique identification code to generate decoded information which verifies the computing device is a member device of the trusted group of member devices and provides contact information for other member devices of the trusted group of member devices, wherein the processor is further configured to control the network interface to establish a communication session with the trusted group of member devices based on the contact information obtained when the unique identification code is decoded.

In another example embodiment, provided is a method performed by a user device that includes one or more of storing a unique identification code encapsulating encoded information about a trusted group of member devices within a decentralized network, the unique identification code being generated by the trusted group of member devices, decoding the stored unique identification code to generate decoded information which verifies that the user device is a member device of the trusted group of member devices and provides contact information for other member devices of the trusted group of member devices, and establishing a communication session with the trusted group of member devices based on the contact information obtained by decoding the unique identification code.

In another example embodiment, provided is a non-transitory computer readable medium having stored therein program instructions that when executed cause a user device to perform a method that includes one or more of storing a unique identification code encapsulating encoded information about a trusted group of member devices within a decentralized network, the unique identification code being generated by the trusted group of member devices, decoding the stored unique identification code to generate decoded information which verifies that the user device is a member device of the trusted group of member devices and provides contact information for other member devices of the trusted group of member devices, and establishing a communication session with the trusted group of member devices based on the contact information obtained by decoding the unique identification code.

Other features and modifications may be apparent from the following description when taken in conjunction with the drawings and the claims.

BRIEF DESCRIPTION OF THE DRAWINGS

For a proper understanding of the examples described herein, reference should be made to the enclosed figures. It should be appreciated that the figures depict only some embodiments and are not limiting of the scope of the present disclosure.

FIG. 2 is a diagram illustrating a process of generating a unique identification code in accordance with an example embodiment.

DETAILED DESCRIPTION

Figure 1:
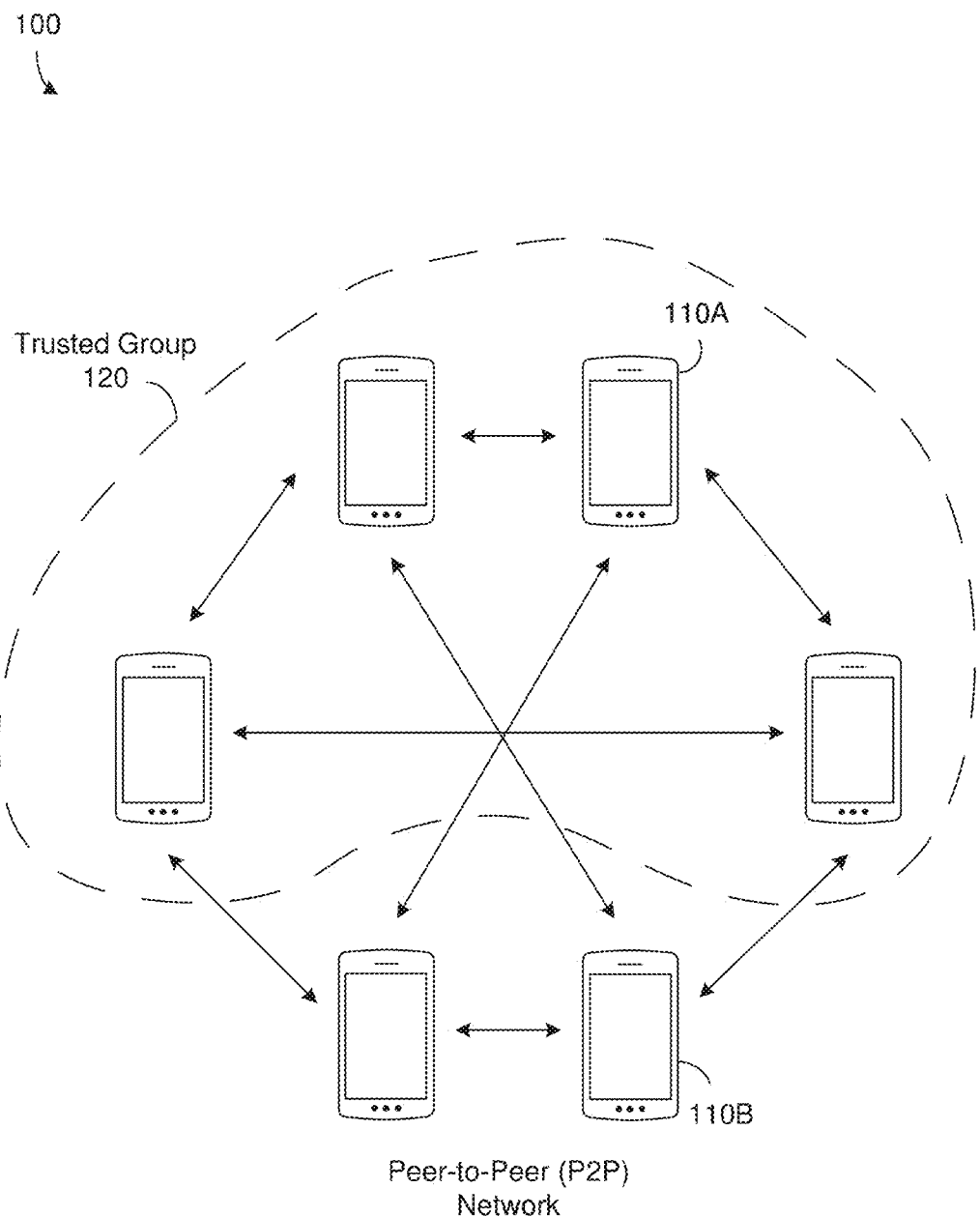
FIG. 1 is a diagram illustrating a trusted group of user devices in a decentralized network in accordance with an example embodiment.

It will be readily understood that the components of the present application, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The features, structures, or characteristics as described throughout this specification may be combined in any suitable manner throughout the embodiments. In addition, the usage of the phrases such as "example embodiments", "some embodiments", or other similar language, throughout this specification is used to indicate that a particular feature, structure, or characteristic described in connection with the embodiment may be included in the at least one embodiment and is not to be construed as being omitted from other embodiments. Thus, appearances of the phrases "example embodiments", "in some embodiments", "in other embodiments", or other similar language, may be used to refer to the same group of embodiments, and the described features, structures, or characteristics may be combined in any suitable manner in one or more embodiments.

In addition, while the term "message" may be used in the description of embodiments, the application may be applied to many types of network data, such as, packet, frame, datagram, etc. The term "message" or "request" may include packet, frame, datagram, and any equivalents thereof. Furthermore, while certain types of messages and signaling requests may be depicted in example embodiments they are not limited to a certain type of message, and the application is not limited to a certain type of signaling.

The instant application in one embodiment relates to a system and method for creating a trusted group of member devices within a decentralized network, and in another embodiment relates to a system and method that generates of a unique group identification (ID) code and performs communication based on contact information that is encapsulated within the unique group ID code. A decentralized network (e.g., an ad hoc network, a peer-to-peer (P2P) network, and the like) typically includes a communication network in which computing nodes such as smart phones, tablets, laptops, desktops, and the like, can connect to one other without relying on a central authority for forming groups therein. Instead, each computing node may connect to other computing nodes to send communications such as email, instant messages, text messages, telephone calls, and the like.

The example embodiments provide a system and method which can create a trusted group of peers or users within a larger network of users. Users may use their user devices to establish a trusted group of users by creating a unique identifier, such as a quick response (QR) code, that encapsulates information relating to the users and their devices and which is used to form the trusted group. For example, each user can have information relating to one or more of their private devices and their contact information embedded or otherwise encapsulated within the code. The identifier can then be used for validating the group members, contacting all members at once over a peer network, selectively contact some member, and validating incoming and outgoing messages or other actions.

According to various aspects, each user in the group receives a copy of the unique identifier instead of a unique identifier being held at one central location, such as a central server. This avoids a single point of failure. Furthermore, a user of the trusted group may add information about multiple devices to the encoded information within the code. In doing so, the multiple devices are not treated as separate users but rather recognized as being owned by a single user that owns multiple devices and can be reached on any of them. As another example, a group decision (or some other communication) can be performed amongst the group members by simply decoding the unique identification code. Contact information for a list of the group members may be encapsulated within the unique identifier and can be extracted by a decoding application to automatically populate an outgoing electronic message.

FIG. 1 illustrates a trusted group of user devices 120 in a decentralized network 100 in accordance with an example embodiment. Referring to FIG. 1, a plurality of user devices 110 are connected to each other in a peer-to-peer fashion without a central authority. As a non-limiting example, the user devices 110 may include smart phones, tablets, laptops, notebooks, desktops, servers, and the like. Each user device may connect to other user devices via a network and a network type such as cellular, data (Internet), satellite, and the like. According to various aspects, the user devices 110 may create a trusted communication group 120 which include user devices 110A and which excludes other/remaining user devices 110B. By forming the trusted communication group 120, the user devices 110A may securely communicate with each other, verify each other, and exclude other user devices 110B from receiving or participating in the trusted communication group.

FIG. 2 illustrates a process 200 of generating a unique identification code in accordance with an example embodiment. According to various aspects, any member of the group of trusted members may initiate the group creation process by requesting the generation of a unique identification code. In the example of FIG. 2, four member user devices are shown (user devices A, B, C, and D) for generating a trusted group. However, the embodiments are not limited to this many users/user devices. Furthermore, each user in this example has only one device, however, it should be appreciated that each user may have more than one user device. Each of the member user devices A, B, C, and D, may have software stored therein which can be used to generate a unique identification code. The software may also be capable of decoding the unique identification code to reveal the encoded information that is encapsulated therein. Because the code (e.g., QR code, bar code, data matrix, etc.) may be stored on the user devices A, B, C, and D, it is not necessary for the code to be optically captured by a camera of the user devices, but instead, may be decoded directly from storage on the user device by one or more decoding applications.

Referring to FIG. 2, in 201, user device A adds contact information of user A, and device information of user device A to a storage item such as a document, a file, a message, or the like. Furthermore, user device A initiates the trusted group by transmitting a message to the other user devices B, C, and D which the user device A desires to form into a trusted group of members. For example, each of the user devices B, C, and D may receive the document or other storage item from the initiating user device A. Here, the initiator's device may request each participant's device for their unique information that will be used to identify them as a member of the group.

In 202, each other participating member device adds identification information and device information to the document or message and returns the document or message back to the user device A. As a non-limiting example, each of the user devices A, B, C, and D, may add personal information such as name, phone number, email address, address, and the like. In some embodiments, the user devices A, B, C, and D may add device information in addition to or instead of personal information. For example, the device information may include a device ID (e.g., unique device identifier (UDID), etc.), an address such as a media access control (MAC) address, IP address, etc., and the like.

In 203, with possession of all the member's unique information, user device A may generate a unique identification code that encapsulates every member's data. The initiating user device A then distributes the unique identifier to all of the other member devices of the trusted group. Each member user device A, B, C, and D can equally use the unique identification code generated by the initiating user device A to access and communicate with the other member devices of the trusted group. Below is a non-limiting example of code that can be used to generate the unique identification code.

```
{
  "Group" : [
    {
      "Users" : [
        {
          "name"
          "Devices" : [
            {
```

```
                "Mac_address": "",
                "Phone_number": "",
                "email_address": ""
              }
            ]
          }
        ]
      }
    ]
  }
]
}
```

Code for Creating Unique Group Identifier

Furthermore, when the initial group of users has been formed, users can be added and/or removed from the trusted group by request and generation of a new unique identification code. For example, a user can remove themselves from the group by distributing to all users a notification to regenerate the unique identifier (without their information included) thereby removing themselves from the group. As another example, a new user could be added to the group when all of the other users consent to such addition. For example, one of the trusted users could transmit a request to the other users to add the new member and the other users of the trusted group may approve/disapprove and sign their decision with the unique identification code as a signature. When the new user is approved (e.g., by consensus, by unanimous vote, etc.) a current member of the trusted group may initiate a new unique identification code beginning with step 201 shown in FIG. 2, with the new user included within the communication.

Figure 3:
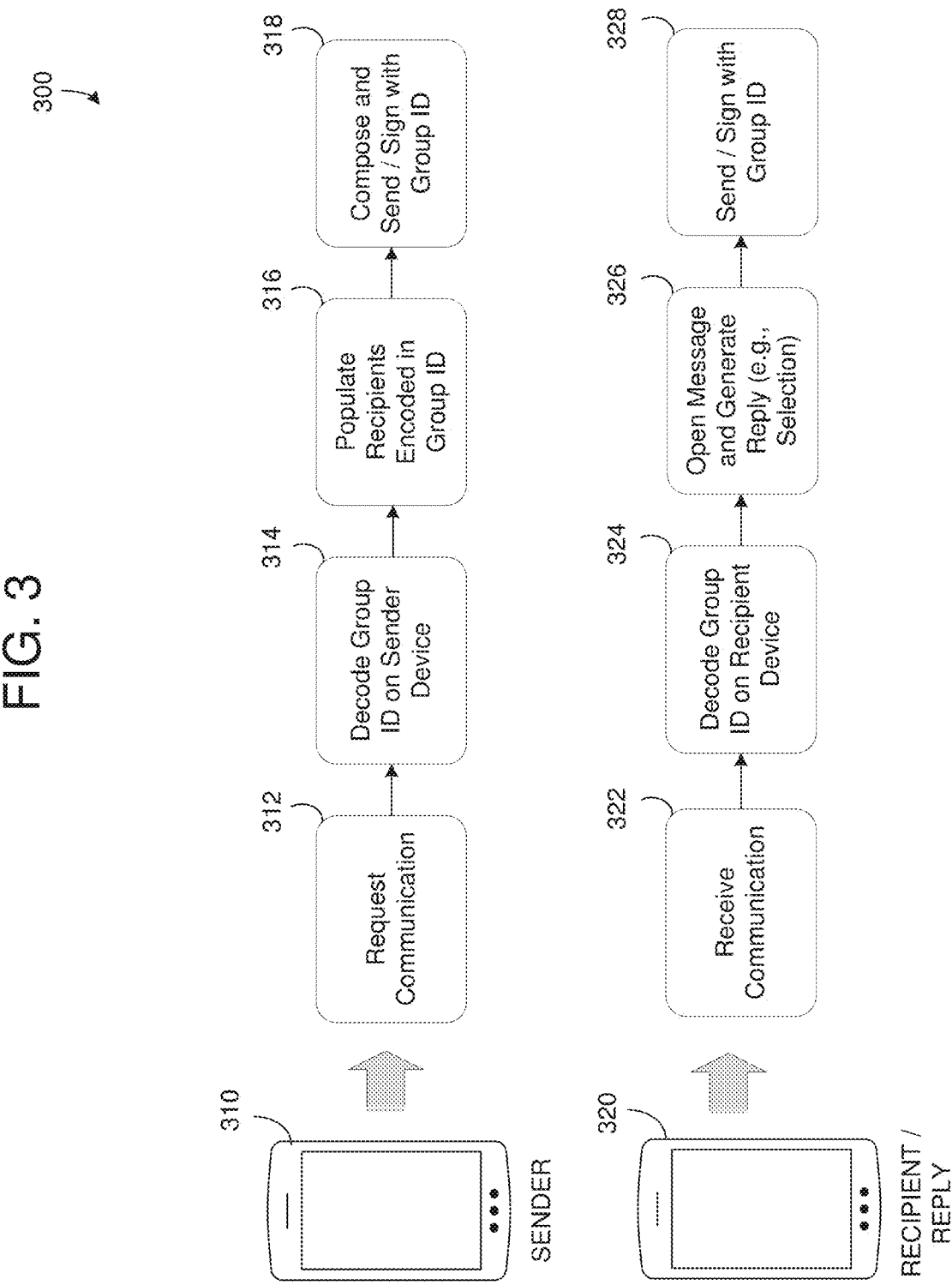
FIG. 3 is a diagram illustrating a process of performing group communication in accordance with an example embodiment.

FIG. 3 illustrates a process 300 of performing communication within the trusted group based on the unique identification code in accordance with an example embodiment. In this example, a first member user device 310 contacts member devices of the trusted group via an electronic message, and a second member user device 320 receives the message and responds. In this example, the unique identifier may be used for validating that a sender is a member of the trusted group and for opening contact information of other group members by decoding the unique identification code. The information stored in the unique identification code may contain basic information such as a user's name and a method of contact such as a phone number, email, address, or the like. In order to make the unique identification code more robust, additional information, such as a MAC address of the phone associated with the phone number may be provided, along with additional product information, as well. After the unique identification code has been generated, it may be distributed to all member devices of the trusted group and stored for subsequent use.

Referring to FIG. 3, in 312, the sender device 310 may trigger an application for generating and decoding a unique identification code. For example, the user may open the application on the sender device 310 and select a communication option or type in a group message through a messaging application which is detected by the decoding application. As another example, the user may select an icon of the unique identification code stored on the screen which triggers a decoding application to verify the unique identification code. In response, in 314, the application decodes the unique identification code stored on the sender device 310 and identifies user and/or device information of the sender device 310 to validate that user and/or the sender device 310. In 316, the decoding application can populate an electronic message with the other members of the group in order to enable an efficient group communication mechanism. In 318, the user of sender device 310 may compose an electronic message by inputting characters, symbols, numbers, pictures, attachments, documents, or the like, and send the electronic message. Prior to sending the electronic message the sending device 310 (or the application thereon) may add a copy of the unique identification code to the message as a signature of the sending device 310, however, embodiments are not limited thereto.

In 322, a recipient device 320 receives the electronic message sent from sending device 310. In 324, an application executing on the recipient device 320 may decode a unique identification code stored on the sending device 320 and verify that the recipient device 320 is a valid member of the trusted group based on information encoded in the unique identification code. In 326 the user/member may open the electronic message in response to validating the recipient device 320 and generate a response to the received message. Furthermore, in 328 the recipient device 320 may transmit the reply message that is signed using the unique identification code stored on the recipient device 320.

The example embodiments include one or more applications that can generate the unique identification code and that can decode the unique identification code stored on the user device without having to capture an image/scan of the unique identification code. Furthermore, the application may pull out the contact information and device information encoded within the unique identification code, allowing the user device to contact another individual group member or all members at once. After the unique identification code has been created and distributed to the members, any given member could be challenged to provide the unique identification code to validate themselves as part of the group, as well as using the unique identification code to validate incoming and outgoing actions.

As a non-limiting example use case, the trusted group may correspond to a group of family members that share a family credit card. The family may create and distribute the unique identification code which is built from the family members' names and phone numbers. Furthermore, one member could decode the unique identification code and use the phone numbers to contact all members to ask permission to make a purchase. The other members receiving the communication may then either approve or disapprove of the purchase, presenting their unique identification code as a signature verification for their transmitted decision.

One of the advantages of the unique identification code provided herein is that each user in the group receives a copy of the unique identification code instead of storing a copy in one central location, which could be a single point of failure. Furthermore, when a user supplies their information that is used to create the unique identification code, they can supply information about multiple devices. That is, they can add multiple means of contact to the identification information. In the example use case where a family communicates for determining whether to use a shared credit card, one of the members may have two mobile devices (e.g., one for personal use and one for business, etc.) In this case, the member is able to add both mobile device phone numbers and/or device information. Other members of the trusted group may contact the member using either number, however when the member in question approves or disapproves of decisions they can answer from either device but only get one vote not two votes.

Figure 4:
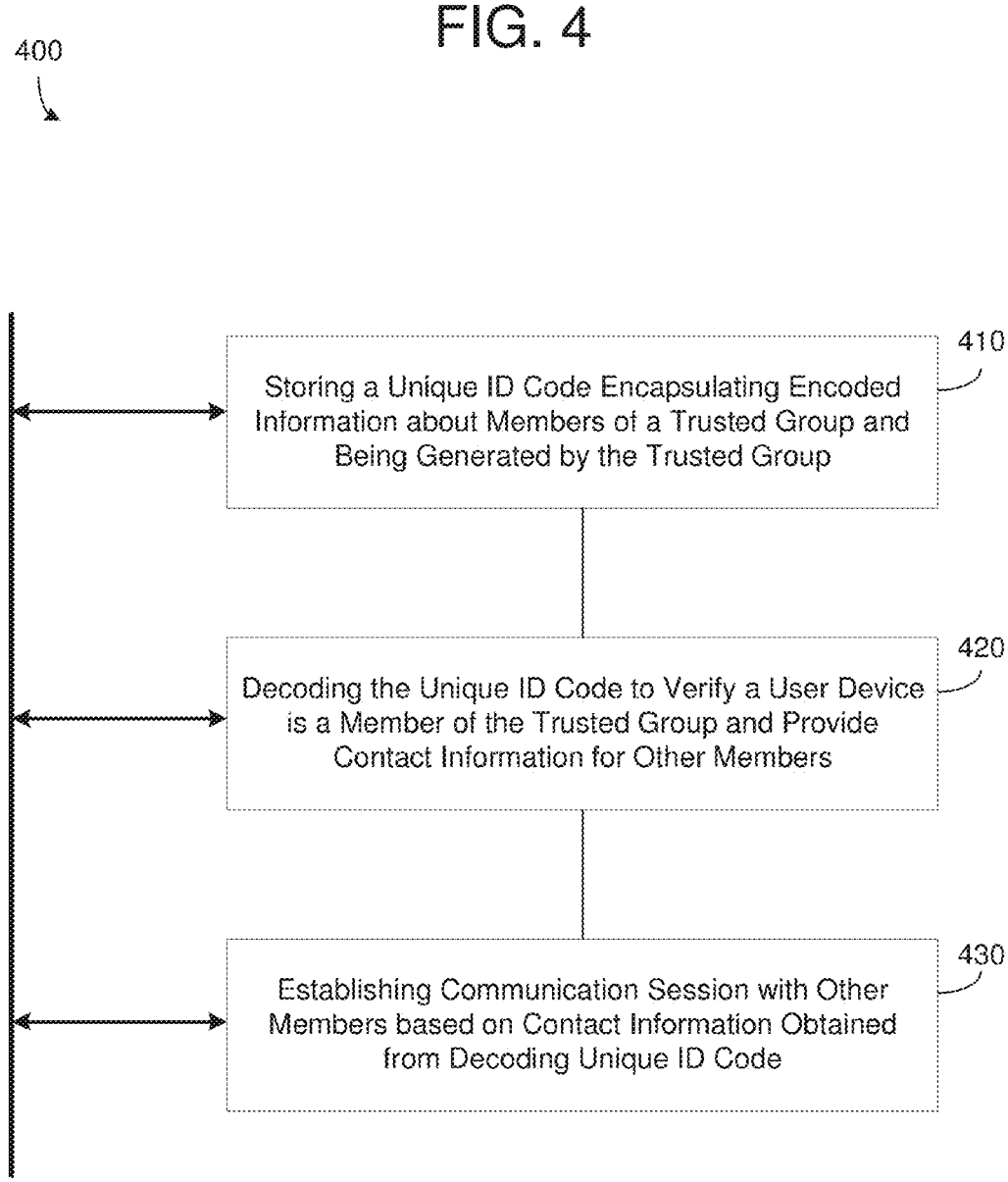
FIG. 4 is a diagram illustrating a method of a user device establishing communication via a trusted group in accordance with an example embodiment.

FIG. 4 illustrates a method 400 of a user device establishing communication via a trusted group in accordance with an example embodiment. For example, the method 400 may be performed by any of the user devices 110A part of the trusted group 120 shown in FIG. 1. The user device may be used for communication among other user devices and may include a computing device such as a laptop computer, a smart phone, a tablet, a desktop computer, a server, a workstation, or the like. In 410, the method includes storing a unique identification code encapsulating encoded information about a trusted group of member devices within an ad hoc network. For example, the unique identification code may include a barcode, a QR code, a data matrix, or the like, which can encapsulate information that has been encoded therein.

According to various embodiments, the encoded information encapsulated in the unique identification code of the trusted group may include contact information to be used for contacting other members of the trusted group via a user device such as one or more of an email address, a phone number, and a name, associated with each member device from among the trusted group. As another example, the encoded information may include device information such as a device ID, a MAC address, or the like. Also, a user may choose to add more than one device to the contact information and may be contacted via multiple devices when trusted group communication is performed.

The unique identification code may be generated by one or more of the member devices within the trusted group such as shown in the process 200 of FIG. 2. In some embodiments, the unique identification code may be generated by the user device performing the method or by another user device that is part of the trusted group. For example, in some embodiments, the method may further include receiving contact information of a user of the user device which is collected via the user device, receiving contact information from remaining member devices in the trusted group which is transmitted via a network, and generating the unique identification code based on the input contact information of the user device and the received contact information from the remaining member devices. Here, the method may further include transmitting the generated unique identification code to each of the remaining member devices among the trusted group. As another example, the method may further include receiving the unique identification code from another member device among the trusted groups of member devices which generated the unique identification code.

In 420, the method includes decoding the stored unique identification code to generate decoded information which verifies that the user device is a member device of the trusted group of member devices and provides contact information for other member devices of the trusted group of member devices. Here, the decoding may reveal the encoded information embedded within the unique group ID code. For example, when a user desires to contact the trusted group, the user may simply launch an application on their user device which decodes the unique identification code and automatically populates an electronic message with sender information of the trusted group. The unique group ID code may include a stored version of the code which can be decoded by a software application and therefore does not need to be scanned by a camera of the user device. The unique identification code may also encapsulate information that is configured to independently verify that each member device is a member of the trusted group. Accordingly, when the user launches the software application they may be required to input the unique group code to verify that they are a member of the trusted group.

In 430, the method includes establishing a communication session with the trusted group of member devices based on the contact information obtained by decoding the unique identification code. In some embodiments, the establishing of the communication session may include transmitting an electronic message to one or more other members of the trusted group and signing the electronic message using the unique identification code. As another example, the establishing of the communication session may include receiving an electronic message transmitted by another member device of the trusted group, generating a reply message, signing the reply message using the unique identification code, and transmitting the signed reply message to the other member device. In some embodiments, although not shown in FIG. 4, the method may further include receiving a request to remove a member device from the trusted group, and generating a new unique identification code based on contact information of remaining member devices of the trusted group except for the member device that is being removed from the trusted group.

The above embodiments may be implemented in hardware, in a computer program executed by a processor, in firmware, or in a combination. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 5:
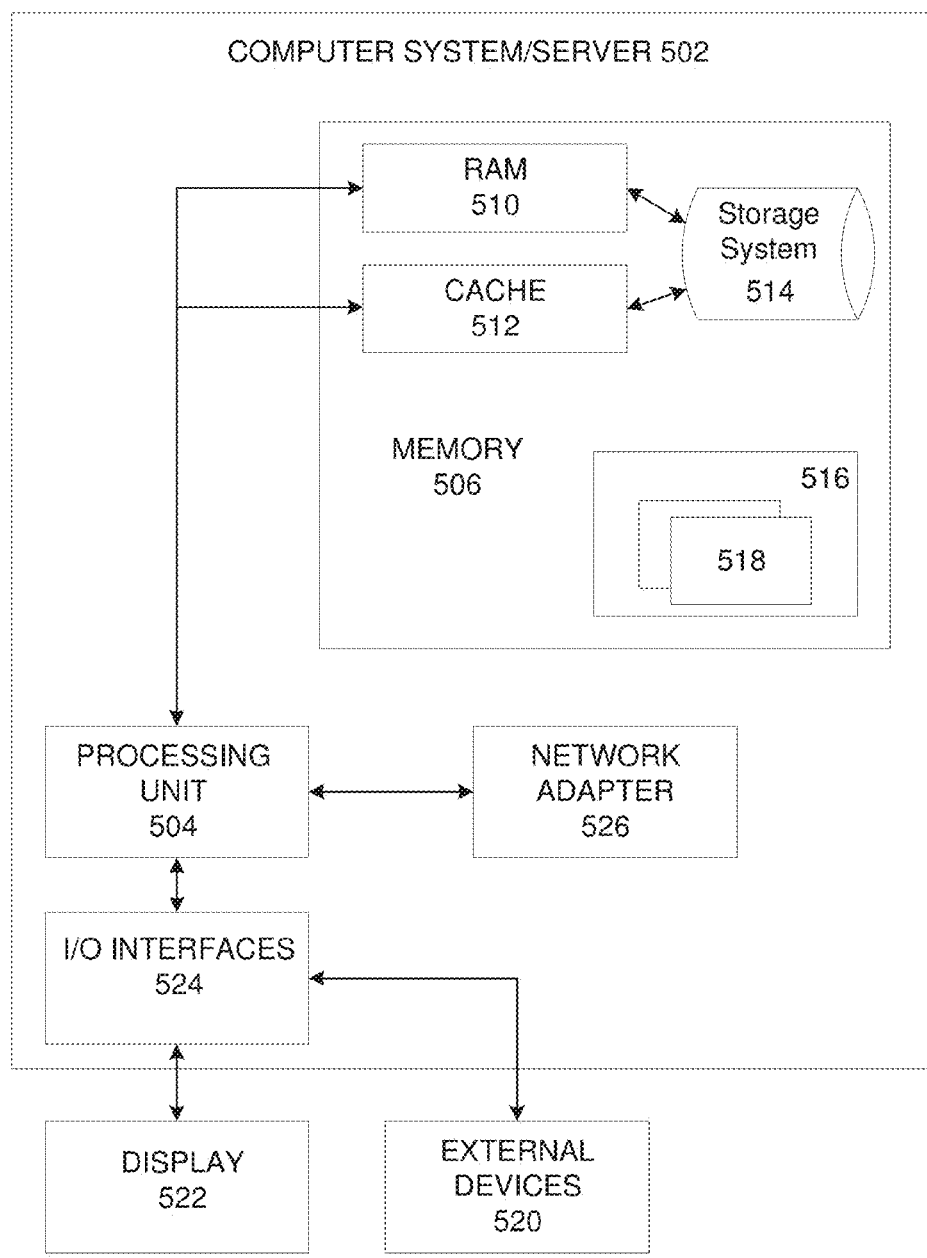
FIG. 5 is a diagram illustrating a computing system in accordance with an example embodiment.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example computer system architecture 500, which may represent or be integrated in any of the above-described components, etc. The computer system 500 may be a single device or a combination of devices. For example, the computer system 500 may be a user device, a database, a server, a cloud platform, a network, a combination thereof, and the like.

FIG. 5 is not intended to suggest any limitation as to the scope of use or functionality of embodiments of the application described herein. Regardless, the computing system 500 (or node 500) is capable of being implemented and/or performing any of the functionality set forth hereinabove. For example, the computing system 500 is capable of generating a unique identification code for a trusted group, decoding the unique identification code to obtain contact information, and performing communication based on decoded information within the unique identification code.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in computing node 500 is shown in the form of a general-purpose computing device. The components of computer system/server 502 may include, but are not limited to, one or more processors or processing units 504 (i.e., processors), a system memory 506, and a bus that couples various system components including system memory 506 to processor 504. The computing node 500 may be a user device 110A shown in FIG. 1 or another device or combination of devices such as a server, cloud platform, database, and/or the like. Also, the computing node 500 may perform the method 400 shown in FIG. 4.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media. System memory 506, in one embodiment, implements the flow diagrams of the other figures. The system memory 506 can include computer system readable media in the form of volatile memory, such as random access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524. Still yet, computer system/server 502 can communicate with one or more networks such as a local area network (LAN), a general wide area network (WAN), and/or a public network (e.g., the Internet) via network adapter 526 (also referred to as a network interface). As depicted, network adapter 526 communicates with the other components of computer system/server 502 via a bus. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

According to various embodiments, the storage 506 may store a unique identification code encapsulating encoded information about a trusted group of member devices within an ad hoc network. For example, the unique identification code may include one or more of a bar code, a quick response (QR) code, and a data matrix, and the encoded information encapsulated in the unique identification code may include one or more of an email address, a MAC address, a phone number, and a name, associated with each member device from among the trusted group. The unique identification code may generated by one or more member devices within the trusted group of member devices. The processor 504 may decode the stored unique identification code to generate decoded information which verifies the computing device is a member device of the trusted group of member devices and provides contact information for other member devices of the trusted group of member devices. Further, the processor 504 may control the network interface 526 to establish a communication session with the trusted group of member devices based on the contact information obtained by decoding the unique identification code.

In some embodiments, the unique identification code may be generated by the computing system 502. As another example, the unique identification code may be generated by another member device and received via the network interface 526. For example, the processor 504 may receive contact information of a user of the computing device 502 which is input via an input unit (not shown) of the computing device 502, receive contact information from remaining member devices in the trusted group which is transmitted via a network and received via the network interface 526, and generate the unique identification code based on the input contact information of the user device and the received contact information from the remaining member devices. In this example, the processor 504 may control the network interface 526 to transmit the generated unique identification code to each of the remaining member devices among the trusted group. In some embodiments, the unique identification code may be generated by another member device. In this example, the network interface 526 may receive the unique identification code from another member device among the trusted groups of member devices which generated the unique identification code or which has possession of the unique identification code but did not generate it.

In some embodiments, the processor 504 may control the network interface 526 to transmit an electronic message to one or more other members of the trusted group and sign the electronic message using the unique identification code. As another example, the network interface 526 may receive an electronic message transmitted by another member device of the trusted group, and the processor 504 may generate a reply message via user input received via an input unit associated with the computing system 502, sign the reply message using the unique identification code, and control the network interface 526 to transmit the signed reply message to the other member device. By signing the electronic message with the unique identification code, other members of the trusted group (or software on the user device) receiving the electronic message can verify/validate the electronic message is from a member of the trusted group. As another example, a member of the group may desire to leave the trusted group. In this example, the processor 504 may receive a request to remove a member device from the trusted group, and generate a new unique identification code based on contact information of remaining member devices of the trusted group except for the member device that is being removed from the trusted group.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

The invention claimed is:

1. A computing device, comprising:
a memory storing program instructions; and a processor configured to execute the instructions, wherein when executed the instructions cause the processor to:

locally store a unique identification code that encapsulates encoded information comprising encoded contact information and encoded device information of members of a trusted group of member devices;

decode, via an application on the computing device, the locally stored unique identification code to decode the encoded contact information and the encoded device information of the trusted group of member devices;

verify that the computing device is a member of the trusted group of member devices based on the decoded device information of the trusted group of member devices;

automatically populate recipient information of an electronic message with the decoded contact information of the trusted group of member devices in response to verifying the computing device is a member of the trusted group; and control the network interface to transmit the electronic message based on the automatically populated recipient information.

2. The computing device of claim 1, wherein the unique identification code comprises a quick response (QR) code, and the encoded contact information encapsulated in the unique identification code includes an email address and a name, associated with each member device from among the trusted group.

3. The computing device of claim 1, wherein the processor is further configured to receive contact information of a user of the computing device which is input via the computing device, receive contact information from remaining member devices in the trusted group which is transmitted via a network, and generate the unique identification code based on the input contact information of the user and the received contact information from the remaining member devices.

4. The computing device of claim 1, wherein the processor is further configured to control the network interface to transmit one or more of:

the unique identification code to other member devices among the trusted group; and an electronic message to one or more other members of the trusted group which is signed using the unique identification code.

5. The computing device of claim 1, wherein the processor is configured to receive the unique identification code from another member device among the trusted groups of member devices.

6. The computing device of claim 1, wherein the unique identification code encapsulates unique device identification information that is configured to independently verify that each member device is a member of the trusted group.

7. The computing device of claim 1, wherein the processor is further configured to sign the electronic message using the unique identification code, and control the network interface to transmit the signed electronic message.

8. The computing device of claim 1, wherein the processor is further configured to receive a request to add a new member device to the trusted group, receive authorization from all members of the trusted group to add the new member device, and generate a new unique identification code based on contact information of the new member device and contact information of current member devices of the trusted group.

9. The computing device of claim 1, wherein the processor is further configured to receive a request to remove a member device from the trusted group, and generate a new unique identification code based on contact information of remaining member devices of the trusted group except for the member device that is being removed from the trusted group.

10. A computer-implemented method performed by a user device, the computer-implemented method comprising:

locally storing a unique identification code encapsulating encoded information comprising encoded contact information and encoded device information of members of a trusted group of member devices;

decoding, via an application on the user device, the locally stored unique identification code to decode the encoded contact information and the encoded device information of the trusted group of member devices;

verifying that the user device is a member of the trusted group of member devices based on the decoded device information of the trusted group of members;

automatically populating recipient information of an electronic message with the decoded contact information of the trusted group of member devices in response to verifying the computing device is a member of the trusted group; and transmitting, via a network interface, the electronic message based on the automatically populated recipient information.

11. The computer-implemented method of claim 10, wherein the unique identification code comprises a quick response (QR) code, and the encoded contact information encapsulated in the unique identification code includes an email address and a name, associated with each member device from among the trusted group.

12. The computer-implemented method of claim 10, further comprising receiving contact information of a user of the user device which is collected via the user device, receiving contact information from remaining member devices in the trusted group which is transmitted via a network, and generating the unique identification code based on the input contact information of the user device and the received contact information from the remaining member devices.

13. The computer-implemented method of claim 10, further comprising transmitting one or more of:

the unique identification code to other member devices among the trusted group; and an electronic message to one or more other members of the trusted group which is signed using the unique identification code.

14. The computer-implemented method of claim 10, further comprising receiving the unique identification code from another member device among the trusted groups of member devices.

15. The computer-implemented method of claim 10, wherein the unique identification code encapsulates unique device identification information that is configured to independently verify that each member device is a member of the trusted group.

16. The computer-implemented method of claim 10, wherein the transmitting further comprises signing the electronic message using the unique identification code, and transmitting the signed electronic message.

17. The computer-implemented method of claim 10, further comprising receiving a request to add a new member device to the trusted group, receiving authorization from all members of the trusted group to add the new member device, and generating a new unique identification code based on contact information of the new member device and contact information of current member devices of the trusted group.

18. The computer-implemented method of claim 10, further comprising receiving a request to remove a member device from the trusted group, and generating a new unique identification code based on contact information of remaining member devices of the trusted group except for the member device that is being removed from the trusted group.

19. A non-transitory computer readable medium having stored therein program instructions that when executed cause a user device to perform a method comprising:
   locally storing a unique identification code encapsulating encoded information comprising encoded contact information and encoded device information of members of a trusted group of member devices;
   decoding, via an application on the user device, the locally stored unique identification code to decode the encoded contact information and the encoded device information of the trusted group of member devices;
   verifying that the user device is a member of the trusted group of member devices based on the decoded device information of the trusted group of member devices;
   automatically populating recipient information of an electronic message with the decoded contact information of the trusted group of member devices in response to verifying the computing device is a member of the trusted group; and
   transmitting, via a network interface, the electronic message based on the automatically populated recipient information.

20. The non-transitory computer readable medium of claim 19, wherein the unique identification code comprises a quick response (QR) code, and the encoded information encapsulated in the unique identification code includes an email address and a name, associated with each member device from among the trusted group.

\* \* \* \* \*